United States Patent [19]
Watanabe

[11] Patent Number: 6,151,699
[45] Date of Patent: Nov. 21, 2000

[54] COMPUTER APPARATUS AND METHOD FOR EDITING PROGRAMS, AND READABLE MEDIUM

[75] Inventor: Kazuyuki Watanabe, Kawasaki, Japan

[73] Assignee: Fujitsu Limited, Kawasaki, Japan

[21] Appl. No.: 09/027,903

[22] Filed: Feb. 23, 1998

[30] Foreign Application Priority Data

Dec. 9, 1997 [JP] Japan ..................................... 9-249111

[51] Int. Cl.[7] ....................................................... G06F 9/45
[52] U.S. Cl. ........................................ 717/1; 717/4; 717/5
[58] Field of Search ................................... 395/701, 702, 395/703, 704, 705, 708; 345/333, 334, 967; 714/37, 38

[56] References Cited

U.S. PATENT DOCUMENTS

| | | | |
|---|---|---|---|
| 5,432,942 | 7/1995 | Trainer ..................................... | 395/708 |
| 5,583,983 | 12/1996 | Schmitter ................................. | 395/705 |
| 5,651,111 | 7/1997 | McKeeman et al. ................. | 364/275.5 |
| 5,671,416 | 9/1997 | Elson ....................................... | 395/702 |
| 5,822,588 | 10/1998 | Sterling et al. ......................... | 395/704 |
| 5,946,488 | 8/1999 | Tanguay et al. ........................ | 395/705 |

FOREIGN PATENT DOCUMENTS

| | | |
|---|---|---|
| 3-116333 | 5/1991 | Japan . |
| 5-88876 | 4/1993 | Japan . |

OTHER PUBLICATIONS

Some et al., "Parsing Minimization when Extracting Information from Code in the Presence of Conditional Compilation", IEEE, 1998, pp 118–125.

Livadas et al., "Understanding Code Containing Preprocessor Constructs", IEEE, 1994, pp 89–97.

Friedrich et al., "The FAPU Workbench" IEEE, 1997, pp 82–87.

*Primary Examiner*—Kakali Chaki
*Attorney, Agent, or Firm*—Staas & Halsey LLP

[57] ABSTRACT

A program edit apparatus simply edits a program without making a programming mistake, even though the program is complicated. The program edit apparatus is provided with a source program storage part, a condition designation part, a display data generation part, and a display part. The source program storage part stores a source program, and the condition designation part designates one of the compile conditions contained in the source program. The display data generation part generates display data by extracting statements to be compiled in accordance with the compile condition designated by this condition designation part, and the display part performs display based on this display data. With this configuration, only statements relates to the compile condition are displayed on the display part.

6 Claims, 7 Drawing Sheets

SOURCE 41

```
01:main()
02:{
03:#ifdef AAA
04:    printf("AAA\n");
05:#endif /* AAA */
06:#ifdef BBB
07:    printf("BBB\n");
08:#endif /* BBB */
09:    printf("ABC\n");
10:}
```

- EFFECTIVE ONLY WHEN 'AAA' CONDITION IS DESIGNATED FOR COMPILE
- EFFECTIVE ONLY WHEN 'BBB' CONDITION IS DESIGNATED FOR COMPILE
- EFFECTIVE UNDER ANY CONDITION

DESIGNATE AAA

SOURCE 42

```
01:main()
02:{
03:    printf("AAA\n");
04:    printf("ABC\n");
05:}
```

— DELETE STATEMENTS '#ifdef, #endif' STORED BY PROCESS A

FIG. 5

SOURCE 42

```
01:main()
02:{
03:     printf("AAA¥n");
04:     printf("ABC¥n");
05:}
```

↓ EMPHASIZED DISPLAY

SOURCE 43

```
01:main()
02:{
03:     printf("AAA¥n");
04:     printf("ABC¥n");
05:}
```

— EFFECTIVE ONLY UNDER CURRENT CONDITION
— NOT EMPHASIZED BECAUSE OF VALIDITY UNDER ANY CONDITION

FIG. 6

SOURCE 44

```
01:main()
02:{
03:     printf("AAA\n");
04:     printf("aaa\n");
05:     printf("ABC\n");
06:     printf("abc\n");
07:}
```

— OPERATOR RECOGNIZES THAT STATEMENTS ARE EFFECTIVE UNDER CURRENT CONDITION
— OPERATOR RECOGNIZES THAT STATEMENTS ARE EFFECTIVE UNDER ANY CONDITION

FIG. 7

SOURCE 44

```
01:main()
02:{
03:    printf("AAA¥n");
04:    printf("aaa¥n");
05:    printf("ABC¥n");
06:    printf("abc¥n");
07:}
```

— OPERATOR RECOGNIZES THAT STATEMENTS ARE EFFECTIVE UNDER DESIGNATED CONDITION
— OPERATOR RECOGNIZES THAT STATEMENTS ARE EFFECTIVE UNDER ANY CONDITION

↓ FORM SOURCE PROGRAM TO BE SAVED

SOURCE 45

```
01:main()
02:{
03:#ifdef AAA
04:    printf("AAA¥n");
05:    printf("aaa¥n");
06:#endif /* AAA */
07:#ifdef BBB
08:    printf("BBB¥n");
09:#endif /* BBB */
10:    printf("ABC¥n");
11:    printf("abc¥n");
12:}
```

— RESTORE SOURCE PROGRAM TO ORIGINAL SOURCE PROGRAM INCLUDING '#ifdef,#end'

— RESTORE REGIONS DESCRIBED IN ORIGINAL SOURCE PROGRAM

COMPUTER APPARATUS AND METHOD FOR EDITING PROGRAMS, AND READABLE MEDIUM

BACKGROUND OF THE INVENTION

1. Field of the Invention

The present invention relates to a program edit apparatus. More particularly, the present invention relates to a program edit apparatus, a program edit method and a computer readable medium used to edit a source program to which a compile condition is designated.

2. Description of the Related Art

In recent years, there are many cases in which new programs written in programming languages such as C language, assembler and COBOL are being developed by modifying a part of program. For example, an original program is revised and is improved according to a hardware configuration, and then new a program is developed. In this way, when the new program is developed by modifying a part of a program, the program is often edited with an editing program (editor). Such editor lightens the burden on a programmer and an operator, and therefore, it is possible to improve productivity in program development.

Further, to make the program useable for various models (hardware), namely, to develop a general-purpose program, there is a case that the program includes compile conditions according to a model of a computer to be used. The compile condition, to distinguish source program statement to be complied only when object program for one model is edited, is designated by writing a preprocessor control statement indicating contents thereof in the source program and the like. Preprocessor is a process in that the source program is rewritten according to designated statement before compiling the source program, namely, a pre-process. The preprocessor control statement is described in the source program in order to show contents of the preprocessor. When a compile condition is designated according to a model to be used, only statements in which the designated compile condition is set and statements used regardless of compilation conditions are extracted from the source program, and then only the extracted statements are compiled by the compiler.

In this way, as various compile conditions are set in the original source program, this source program becomes complicated, therefore, the edit operation for this source program becomes complicated. On this account, it is requested to provide a program edit apparatus capable of easily editing the source program which becomes complicated by setting various compile conditions.

Conventionally, there is a source program edit method in which the source program is displayed as it is and then is edited, and a source program edit method in which the complicated source program is divided and then edited, and the like.

However, according to the source program edit method in which the source program is displayed as it is, when the source program becomes complicated by setting various compile conditions are described, it becomes difficult for a programmer to understand the source program containing the complicated compile conditions. Therefore, there is a high possibility in that programming mistakes are produced.

Further, according to the source program edit method in which the complicated source program is divided, it becomes difficult to administrate the divided source program. On this account, there is a high possibility in that programming mistakes are produced and there is a problem in that the editing operation of the source program becomes complicated.

SUMMARY OF THE INVENTION

It is an object of the present invention to solve the above described problems and to provide a program edit apparatus, a program edit method and a computer readable medium capable of editing program simply without producing programming mistakes even if program to be edited is complicated.

The present invention introduces the followings to solve the above described problems.

The present invention provides a program edit apparatus for editing a source program read from a source program storage part and containing at least a compile condition. The program edit apparatus comprises a condition designation part, an extraction part, and a display part.

The source program storage part stores the source program. The condition designation part designates one of compile conditions contained in the source program. The extraction part extracts text statements to be compiled from the source program in accordance with the compile condition designated through the condition designation part. The display part displays the statements.

According to this program edit apparatus, the source program to be edited is read from the source program storage part. One of the compile conditions contained in the read source program is designated. When the compile condition is designated, statements to be compiled are extracted from the source program in accordance with the designated compile condition. Then, the extracted statements is displayed. As the result, only statements to be complied according to the designated compile condition are displayed. Thus, the operator can understand the source program easily and reduce programming mistakes.

Further, the program edit apparatus according to the present invention may be provided with an automatic edit part editing the source program based on the compile condition inputted through the condition designation part and the statements extracted by the extraction part, and a save part saving the source program edited by the automatic edit part into the source program storage part.

According to this program edit apparatus, the source program read from the source is automatically edited based on the compile condition designated through the condition designation part and the statements extracted from the source program by the extraction part. Then, the source program which is automatically edited is stored in the source program storage part. With this arrangement, when the compile condition is designated once, the source program is automatically edited and stored in accordance with the designated compile condition and the displayed statements. Thus, the edit operation is not troublesome.

Moreover, a program edit apparatus according to the present invention may be structured in manner that the extraction part emphasizes only the statements related to only the compile condition inputted through the condition designation part.

In addition, a program edit method of editing a source program containing at least a compile condition, comprises a step of reading an edit program, a step of reading the source program to be edited by the edit program, a step of designating one compile condition contained in the source program, a step of extracting statements to be compiled from the source program in accordance with the compile condition which is designated, a step of displaying the statements, a step of editing the source program based on the compile condition which is designated and the statements which are displayed.

Furthermore, the present invention is a computer readable medium storing an edit program edit a source program containing at least one compile condition, the edit program making computer connected to a display device execute steps. These steps comprise a step of designating a compile condition contained in the source program, a step of extracting statements to be compiled from the source program in accordance with the compile condition which is designated, displaying the statements, and a step of editing the source program based on the designated compile condition and the displayed statements.

As storage media, ROM (Read Only Memory), RAM (Random Access Memory), CD-ROM (Compact Disc Read Only Memory), FD (Floppy Disk), HD (Hard Disk), MO (Magneto-Optical) Disk, PD and the like are used.

BRIEF DESCRIPTION OF THE DRAWINGS

Other objects and advantages of the present invention will become apparent during the following discussion conjunction with the accompanying drawings, in which.

DETAILED DESCRIPTION OF THE PREFERRED EMBODIMENTS

Hereinafter, the present invention will be described in detail.

Figure 1:
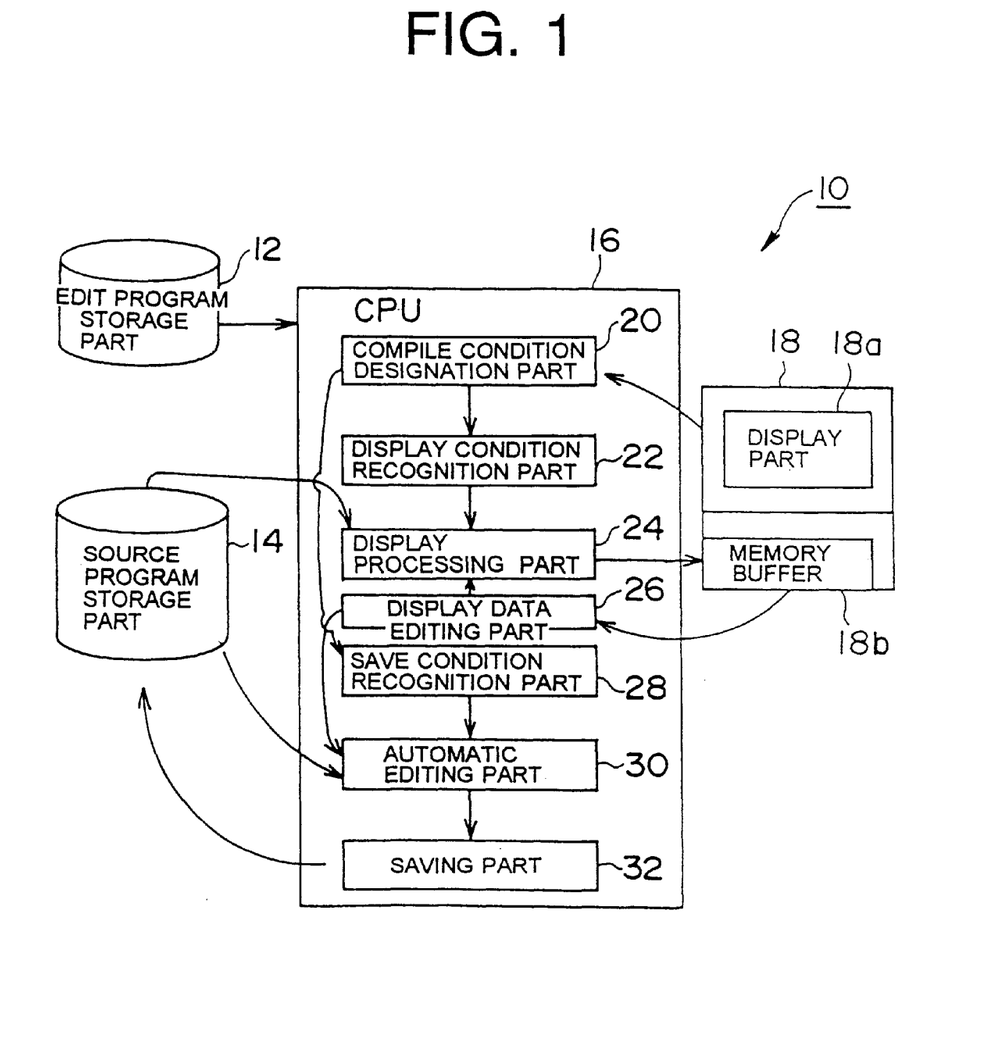
FIG. 1 is a block diagram showing a program edit apparatus of an embodiment according to the present invention.

FIG. 1 shows a configuration of a program edit apparatus of an embodiment according to the present invention. The program edit apparatus 10, as shown in FIG. 1, is provided with an edit program storage part 12, a source program storage part 14, a CPU (Central Processing Unit) 16 and a console 18.

The edit program storage part 12 stores an edit program executed in the CPU 16. This edit program is read from the edit program storage part 12 into the CPU 16 in accordance with an editing command inputted through the console 18. The edit program storage part 12 includes a recording medium such as a RAM (Random Access Memory), a magnetic disk, a magnetic tape, a magneto-optic disk, a IC (Integrated Circuit) card, and a flash memory.

The source program storage part 14 stores source program edited in the CPU 16. The source program storage part 14 has of a recording medium similar to the edit program storage part 12. The source program stored in the source program storage part 14 is program to be edited. The source program is read from the source program storage part 14 in accordance with an edit command inputted through the console 18. Further, the source program is described in C language containing text statements, comments, preprocessor control statements and so on.

The text statement is an instruction statement to be actually executed while the program runs, and is compiled before execution. The comment is a remark statement unrelated to processes of the program, and is not compiled. The preprocessor control statement shows the pre-process before executing compile and is a control statement supporting macro definition, file reading, compile condition setting and so on.

The console 18 indicates data outputted from the CPU 16, and is used to designate a compile condition, to input a command and data, and the like. The console 18 is provided with a display part 18a indicating data and a memory buffer 18b temporarily storing data to be indicated by the display part 18a.

The CPU 16 is provided with a compile condition designation part 20, a display condition recognition part 22, a display processing part 24, a display data editing part 26, a storage condition recognition part 28 and an automatic editing part 30 and a saving part 32. These parts 20 through 32 are implemented by executing the edit program in the CPU 16.

The compile condition designation part 20 accepts a compile condition inputted by an operator through the console 18. The compile condition corresponds to a computer of a desired model. For example, "AAA" is designated.

The display condition recognition part 22 recognizes (stores) the compile condition accepted by the compile condition designation part 20, namely, the designated compile condition "AAA".

The display processing part 24 generates display data to be displayed by the display part 18a. Concretely, the display processing part 24 reads the source program to be edited from the source program storage part 14, and deletes unnecessary statements for compile according to the compile condition recognized by the display condition recognition part 22 (the designated compile condition), namely, text statements and comments related to the preprocessor control statements indicating other compile conditions, comments and preprocessor control statements, thereby generating display data. In addition, the display processing part 24 corresponds to the extraction part.

In other words, the display data consists of text statements related to the designated compile condition and text statements compiled regardless of the designated compile condition (statements executed by any model). Further, in this displayed data, the text statement related to the designated compile condition is emphasized.

The generated display data is sent to the memory buffer 18b in the console 18. The display part 18a reads the display data stored in the memory buffer 18b at any time and indicates it on a display not shown.

The operator performs the edit operation to data (text statements) indicated on the display not shown. Concretely, the operator inputs editing commands such as a deleting command, an adding command, and a moving command for the data indicated on the display (not shown) into the display data editing part 26 through the console 18. Further, the operator inputs a mode setting command while editing data. The mode setting command is used to set a first mode in that text statements related to the designated compile condition are edited or a second mode in that statements are edited regardless of the designated compile condition. The operator inputs the mode setting command, thereby capable of editing text statements while recognizing whether text statements related to the designated compile condition are edited or text statements are edited regardless of the designated compile condition.

The display data editing part 26 reads the display data stored in the memory buffer 18b of the console 18, and executes edit operation for this display data in accordance with an editing command inputted through the console 18. In addition, the display data edited by the display data editing part 26 is fed back to the display processing part 24 one after another, therefore, data displayed by the display part 18a is reflected by editing contents. Then, the display data, which is finally edited by the display data editing part 26, is sent to the automatic editing part 30.

The storage condition recognition part 28 recognizes the compile condition accepted by the compile condition designation part 20, namely, the compile condition designated through the compile condition designation part 20, as a storage condition. This storage condition is used when the display data (text statement) edited by the display data editing part 26 is reflected to the source program stored in the source program storage part 14.

The automatic editing part 30, based on the storage condition recognized by the storage condition recognition part 28, reflects data (text statement) edited by the display data editing part 26 on the source program stored in the source program storage part 14. With this reflection, the automatic editing part 30 edits the source program automatically.

The storage part 18 overwrites the source program edited by the automatic editing part 30 into the source program storage part 11.

In this way, the compile condition designation part 20 through the display processing part 24, among statements contained in the source program, display only text statements related to the designated compile condition and text statements to be compiled regardless of conditions on the display part 18a, and emphasizes only statement related to the designated compile condition. Then, the program edit part 26 through the storage part 32 edit the source program in accordance with the edit contents and the storage condition inputted from the console 18.

With this arrangement, when the operator inputs a designation command and an editing command of the source program through the console 18, the designated source program is read from program storage part 14 into the CPU 16, and the editing program is read from the editing program storage part 12 into the CPU 16.

Then, when the operator designates a compile condition, the display processing part 24 generates display data, which contains only two kinds of text statements compiled according to the designated compilation condition (text statement related to the designated compile condition and text statement compiled regardless of the designated compile condition) and in which only the text statement related to the designated compile condition is emphasized.

The generated display data is displayed on the display part 18a of the console 18. The operator edits the display data. In addition, the operator inputs a mode setting command when editing data. This mode setting command is used to set whether an edition for the text statement related to the designated compile condition (first mode) or an edition for the text statement complied regardless of the designated compile condition (second mode). The operator can perform an edition while recognizing whether this edition is given to the text statement related to the designated compile condition or the text statement complied regardless of the designated compile condition.

In this way, the compile condition designation part 20 through the display processing part 24 make the display part 18a display only the text statement related to the designated compile condition and the text statement to be compiled regardless of the designated compile condition in each statement contained in the source program, and emphasizes only statements related to the designated compile condition. Then, the program edit part 26 through the storage part 32 automatically edit the source program in accordance with the edit contents and the storage condition inputted through the console 18.

With this arrangement, when the operator inputs a designating command of the source program and an editing start command through the console 18, the designated source program is read from the source program storage part 14 into the CPU 16, and the edit program is read from the editing program storage part 12 into the CPU 16.

Then, when the operator designates a compile condition, the display processing part 24 generates display data, which contains only text statements to be compiled in accordance with the designated compile condition (text statement related to the designated compile condition and text statement to be compiled regardless of compile condition) and in which only statement related to the designated compile condition is emphasized.

Then, when the operator inputs an editing command as stated above, display data is edited by the display data editing part 26.

When display data is edited in this way, the edited display data is sent to the automatic editing part 30 from the display data editing part 26. Further, the storage condition recognition part 28 recognizes the compile condition accepted by the compile condition designation part 20 as a storage condition. The recognized storage condition is sent to the automatic editing part 30 from the storage condition recognition part 28. Then, the automatic compile part 30 automatically edits the source program based on the edited display data (text statement) and the storage condition. The edited source program is sent to the storage part 32 from the automatic editing part 30. The storage part 32 overwrites the edited source program into the source program storage part 14.

In this way, the operator can edit a source program simply without making a programming mistake even if the source program to be edited is a complicated program in which various compile conditions are designated.

<Edit Process>

Explanations will be given of a flow of the edit process executed by the CPU 16 according to the edit program stored in the edit program storage part 12 with reference to FIG. 2 through FIG. 7. In addition, the following explanations will be discussed with reference to a sample, in which a source program described in the C Language is edited by the edit program. The source program described in the C Language consists of text statements showing program contents to be actually executed, comments surrounded by // and showing notes (helpful information) which are not compiled, preprocessor control statements showing pre-process of the program indicated by # at the top (see FIG. 4 and FIG. 7).

Figure 2:
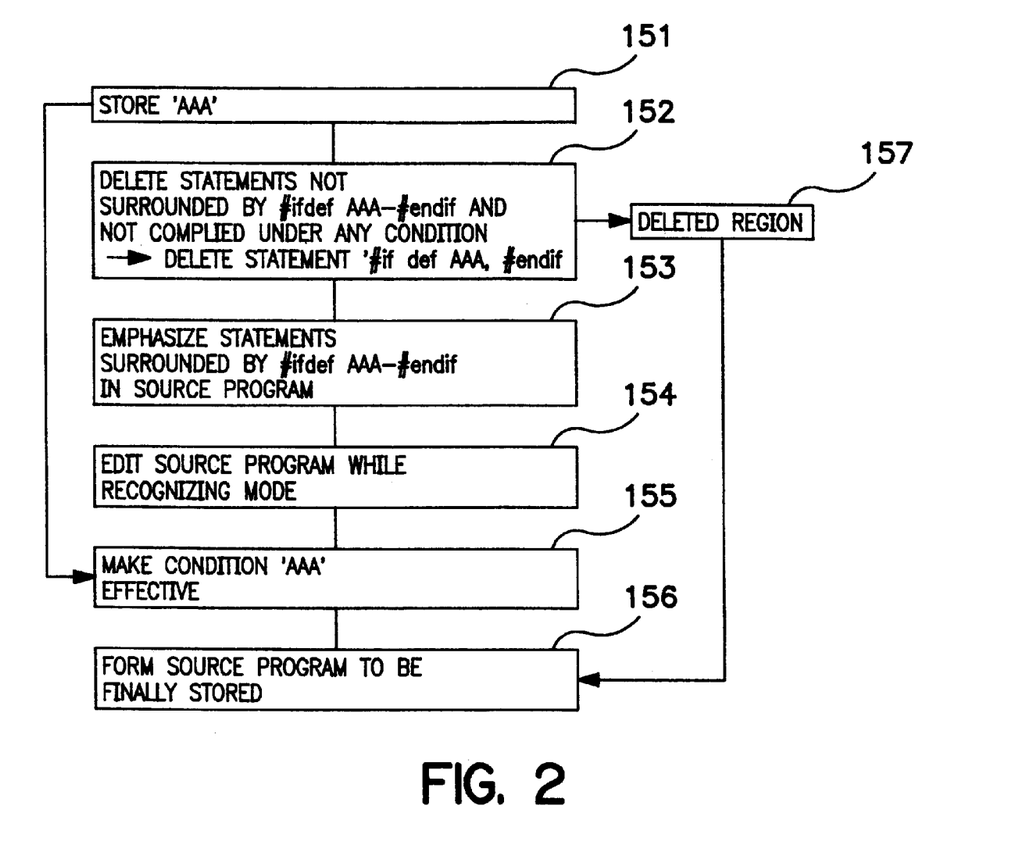
FIG. 2 is a flowchart showing an outline of an edit process.

FIG. 2 is a flowchart showing the outline of the edit process. As shown in FIG. 2, the edit process can be divided into processes S151 through S157. First, the CPU 16 memorizes a designated compile condition AAA (process S151). Next, the CPU 16 leaves text statements related to the compile condition AAA (surrounded by #ifdef AAA, #endif) and text statements to be compiled regardless of the designated compile condition, and eliminates another statement except these statements, namely, text statements related to another compile condition, comments and preprocessor control statements (process S152). Then, the CPU 16 emphasizes only text statements related to the designated compile condition (surrounded by #ifdef AAA, #endif) and displays them (process S153).

While these text statements are displayed as above, the operator edits the displayed text statement after setting a desired mode by inputting a mode setting command through the console 18 (process S154). At this time, the operator sets a mode before inputting editing contents, therefore, the editing person can input editing contents while distinguishing whether an edit for the statement related to the designated compile condition AAA (first mode) or an edit for the statement to be compiled regardless of the compile condition AAA (second mode). After editing, the CPU 16 validates (re-recognizes) the compile condition AAA memorized in the process S151 (process S155). Then, the CPU 16 reflects the edited display data on the program stored in the source program storage part 14, thereby forming a source program containing statements eliminated by the process S152 formed into deleted region S157 (statement related to only another compile condition, comment, preprocessor control statement) (process S156).

Figure 3:
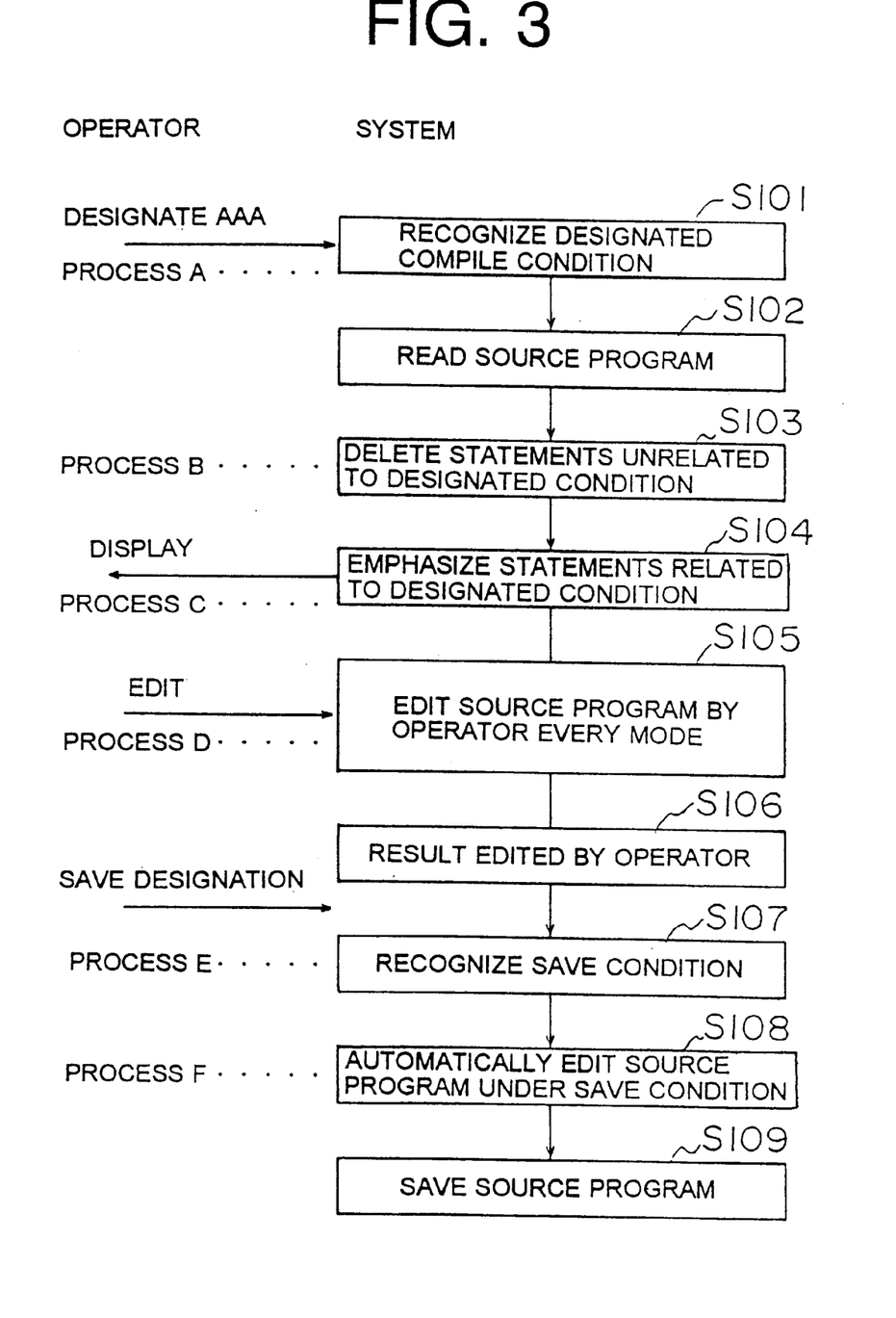
FIG. 3 is a flowchart showing an edit operation.

FIG. 3 is a flowchart showing the editing process in detail. As above described, this flowchart starts with the edit trigger command inputted by the operator through the console 18 as a trigger. As shown in FIG. 3, when the operator specifies the compile condition "AAA", the display condition recognition part 22 in the CPU 16 executes the process A, and recognizes (stores) the compile condition AAA designated by the operator through the console 18 (S101). Then, all of the source program shown in FIG. 4 (source 41) is read from the source program storage part 14 into the display processing part 24 in the CPU 16 (S102).

Then, the display processing part 24 in the CPU 16 executes the process B, and eliminates text statement related to non-designated compile condition, comment and preprocessor control statement (S103).

Figure 4:
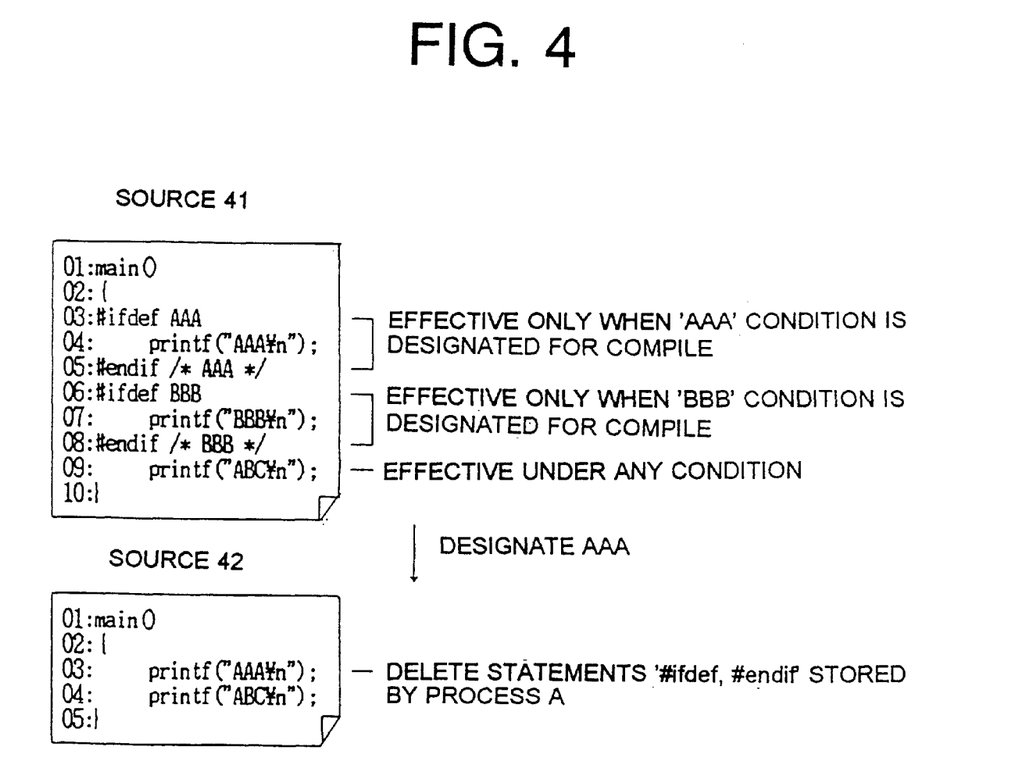
FIG. 4 is an explanatory view showing a process B.

The process B, when the compile condition "AAA" is designated, eliminates text statements to be compiled in a case that the other compilation condition "BBB" is designated, preprocessor control statements such as #ifdef BBB and #endif and comments such as /*BBB*/ from the source program 41 read in the step S102, and forms a source 42 containing only text statements. At this time, text statements which are not influenced by the compile condition, namely, text statements to be compiled whenever any model of computer is used, are complied in default (regardless of conditions), therefore, these text statements are not eliminated. Thus, in the source program 41, text statements which are not put between "#ifdef AAA" and "#endif" or between "#ifdef BBB" and "#endif", such as "printf("ABC\n");" is compiled regardless of compile conditions (models), therefore, these statements are left in the source program 42 without being eliminated.

Thereafter, the display processing part 24 in the CPU 16 executes the process C and emphasizes only the text statements related to the designated compile condition (S104).

Figure 5:
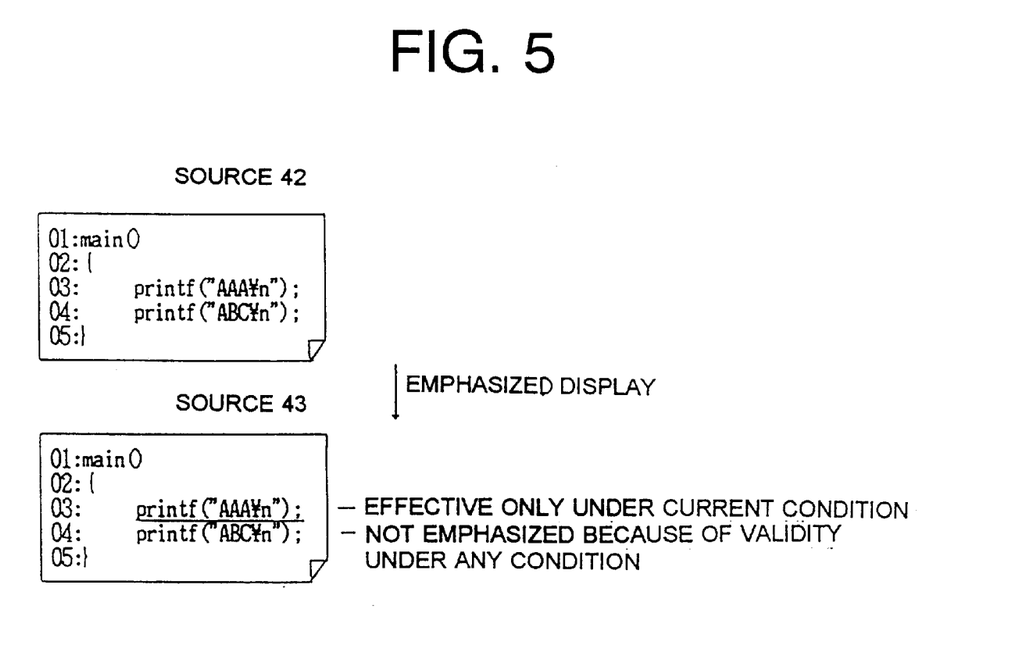
FIG. 5 is an explanatory view showing a process C.

The process C, as shown by an example of FIG. 5, emphasizes only the text statements related to the compile condition AAA, namely, the text statements surrounded with "#ifdef AAA"–"#endif" in the source program 41 by giving color, qualification or the like. In other words, the process C distinguishes whether text statements to be compiled only when the compile condition AAA is designated or text statements to be compiled regardless of compile conditions.

The source program (display data) 43, which is processed as above described, is temporarily kept in the memory buffer 18b, and then is displayed on the display part 18a. Then, the display data editing part 26 in the CPU 16 edits the program in accordance with the edit command inputted by the operator with reference to display data 43 (S105). At that time, the display data editing part 26 switches two modes (compile condition AAA and non-condition) in accordance with the mode selection command inputted by the operator, and then executes the edit process.

Figure 6:
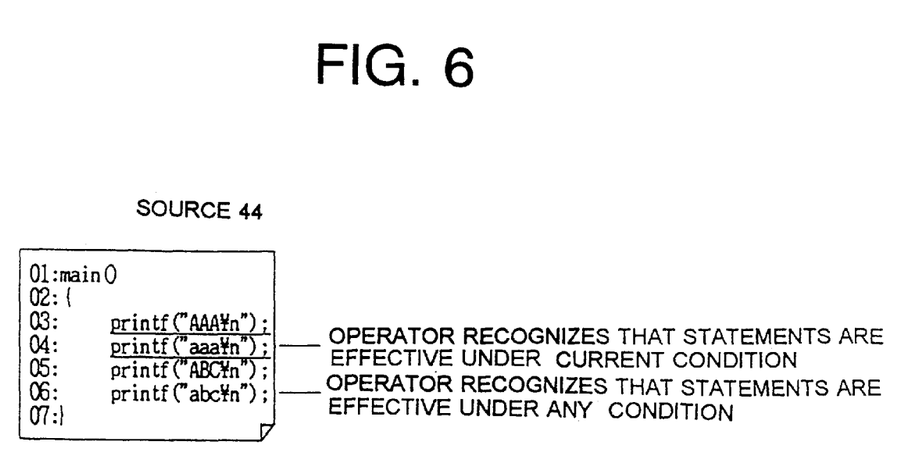
FIG. 6 is an explanatory view showing edited result to be displayed.

In an example of FIG. 6, among the display data 44, "printf("aaa\n");" is added as a statement related to the compile condition AAA, and "printf("abc\n"); is added as a statement to be compiled regardless of conditions.

Then, the display processing part 24, which has received the edited display data 44 from the display data editing part 26, displays the edited text statement (source 44) on the display part 18a of the console 18 (S106).

When the edit operation is finished, the operator instructs to store the edited program through the console 18. When it is instructed to store program, the storage condition recognition part 28 in the CPU 16 executes the process E (S107). The process E re-recognizes the compile condition AAA which is already designated as a storage condition for storing source program.

Then, the automatic editing part 30 in the CPU 16 executes the process F (S108). The process F puts text statements to be the edited display data 44 received from the display data editing part 26 into the source program read from the source program storage part 14 in accordance with the inputted mode.

Figure 7:
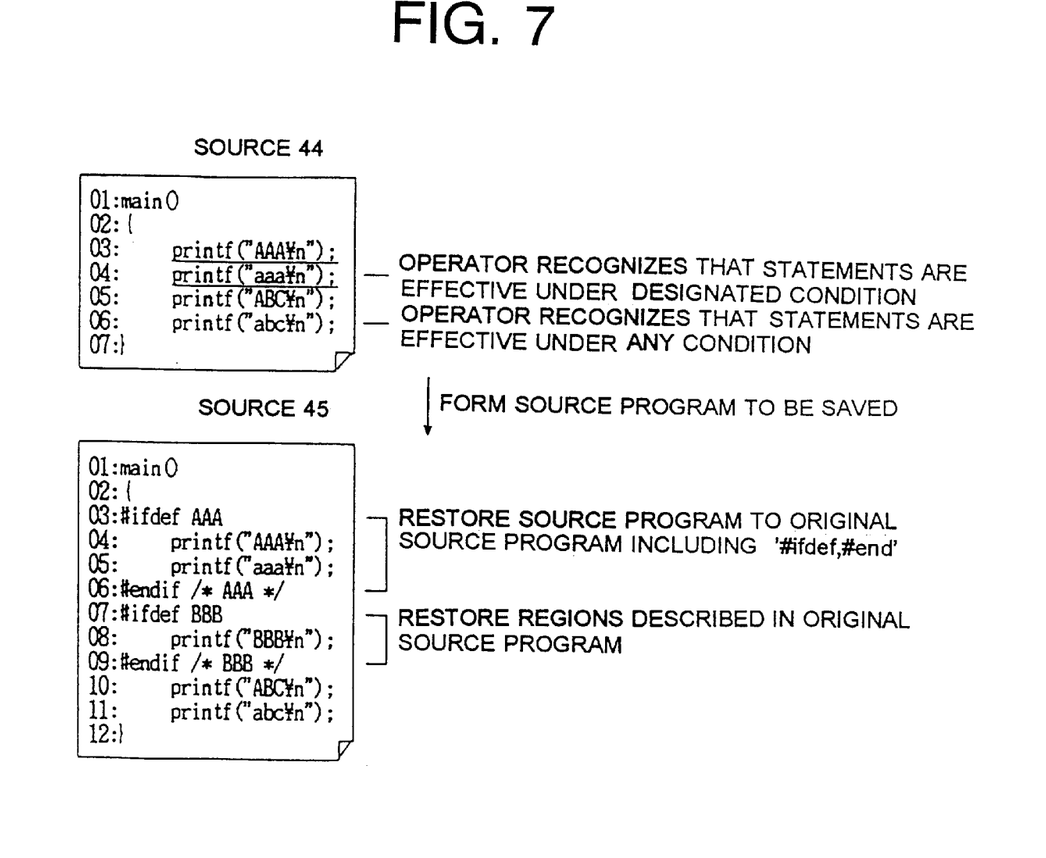
FIG. 7 is an explanatory view showing a process F.

As shown in FIG. 7, the automatic editing part 30 generates a source program 45 to contain parts eliminated in the process B (text statements, comments and preprocessor control statement which are not surrounded with #ifdef AAA and #endif) (S103).

In the display data 44, "printf("aaa\n");" is added in right after of the third line "printf("AAA\n");" as a text statement to be compiled only in the compile condition. Thus, when the source program 45 is generated based on the display data 44, "printf("aaa\n");" is put in right after of "printf ("AAA\n");". In addition, the source program 45 to be finally stored is formed not so as to ruin versatility. That is, the source program 45 includes also parts eliminated by the display processing part 24 (text statements related to only another compile condition, comments, preprocessor control statements) so as to be compilable even if any compile condition such as the compile condition AAA and the compile condition BBB is designated.

The storage part 32 in the CPU 16 overwrites the source program (source 45) which is automatically compiled into the source program storage part 14 (S109).

Here, one cycle of the edit process is completed. In addition, when another compile condition "BBB" is designated, this edit process (S101 through S109) is repeated and then the source program is edited furthermore.

According to this embodiment, when a compile condition is designated, only text statements related to the designated compile condition and text statements to be compiled regardless of the designated compile condition (parts necessary for editing) is displayed, and only text statements related to the designated compile condition is emphasized. The operator switches modes in accordance with the edit contents with reference to the above-described two kinds of text statements. After editing, when it is instructed to store the source program, the source program (source 45) is automatically generated based on the edited text statement, regarding the designated compile condition as a storage condition. Then, the edited source program (source 45) is overwritten in the source program storage part 14.

In this way, the operator specifies a compile condition when editing the source program to which various compile conditions are designated, whereby text statements related to the designated compile condition and statements to be complied regardless of the designated compile condition are displayed, and only the text statements related to the designated compile condition are emphasized. Thus, it is possible for the operator to understand the process contents of the program easily and to perform the edit operation simply. Further, the operator can designate a compile condition freely and edit program. Thus, even if compile conditions are complicated in program, the operator can edit the program simply.

Moreover, if only setting a mode, the operator can input edit contents after distinguishing whether an edit for text statements related to the designated compile condition or text statements to be compiled regardless of compile conditions. Thus, it is unnecessary for the operator to add compile condition in program editing, therefore, there is no case that edit operation becomes complicated.

Furthermore, after editing, source program is automatically generated based on the designated compile condition and the edited statement, and then is stored. With this arrangement, when a compile condition is designated once, it is possible to edit and store source program without designating the compile condition again. Thus, the edit operation of the source program is not troublesome.

Additionally, in this embodiment, the explanation is given of the edit operation for one source program stored in the source program storage part 14, however, this invention is not limited to this and may be applied to a case that a plurality of various program are stored in the source program storage part 14. When a plurality of program are stored in the source program storage part 14, the editing person may designate a file name of source program or the like to read the source program from the source program storage part 14, and may designate a compile condition and perform an edit operation.

In this embodiment, the explained is given of the sample in that source program is described in C language, however, this invention may be applied to program described in various languages such as assembler, COBOL, FORTRAN. Further, this invention may be applied to edit various types of source program such as OS (Operating System) or AP (Application Program).

Further, in this embodiment, the explanation is given of the case that the compile condition is designated every model, however, this invention is not limited to this, the compilation condition may be designated in accordance with various circumstances.

As above described, according to the program edit apparatus, the program edit method and the computer readable medium of the present invention, it is possible to display only parts necessary to edit (text statements related to the designated compile condition and text statements to be complied regardless of the designated compile condition) and emphasizes only the text statements related to the designated compile condition. With this arrangement, the operator can understand program and perform the edit operation. Thus, it is possible to reduce programming mistake and to simplify the edit operation.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A computer apparatus to edit a source program read from source program storage means, said source program containing one or more compile conditions, said computer apparatus comprising:

condition designation means for designating one of a plurality of compile conditions contained in the source program, the designating being performed in response to an operator inputting the designated compile condition to the computer apparatus;

extraction means for extracting one statement to be compiled from a plurality of statements, the extracted statement to be compiled in accordance with the designated compile condition and each of said statements corresponding to each of said compile conditions included in the source program, wherein the extracting is performed in accordance with the designated compile condition; and display means for displaying said one extracted statement.

2. The computer apparatus according to claim 1, further comprising:

automatic edit means for editing the source program based on the compile condition inputted through the condition designation means and said one statement extracted from the source program by the extraction means; and save means for saving the source program edited by the automatic edit means into the source program storage means.

3. The computer apparatus according to claim 1, wherein said extraction means generates the display data emphasizing said one statement related only to the compile condition inputted through said condition input means.

4. A method for editing a source program containing one or more compile conditions on a computer, comprising steps of:

reading a program for editing;

reading the source program to be edited by the program for editing;

designating one of said compile conditions contained in the source program in response to a compile condition inputted to the computer by an operator;

extracting one statement to be compiled from the source program wherein the extracted statement is to be compiled accordance with the designated compile condition and the extracting is performed in accordance with the designated compile condition;

displaying the extracted statement; and editing the source program based on the designated compile condition and the displayed statement.

5. A computer readable medium storing an edit program for editing a source program containing one or more compile conditions, said edit program making a computer connected to a display device, said steps comprising:

designating one compile condition from said compile conditions contained in the source program in response to a compile condition inputted to the computer by an operator;

extracting one statement to be compiled from the source program, such that compiling of the extracted statement and said extracting are in accordance with the designated compile condition; and displaying said one extracted statement; and editing the source program based on the designated compile condition and the displayed statement.

6. A computer readable storage medium storing editing code for editing source code containing one or more compile conditions, said editing code comprising:

code to designate one compile condition contained in the source program in response to inputting the one compile condition from an operator;

code to extract only one statement to be compiled from a plurality of statements, each of said plurality of statements corresponding to each of said compile conditions included in the source program, wherein the extracted statement is to be compiled in accordance with the designated compile condition and said extracting is performed in accordance with the designated compile condition; and code to display the one extracted statement.

* * * * *

UNITED STATES PATENT AND TRADEMARK OFFICE
CERTIFICATE OF CORRECTION

PATENT NO.   : 6,151,699
DATED        : November 21, 2000
INVENTOR(S)  : Kazuyuki Watanabee Page 1 of 1

It is certified that error appears in the above-identified patent and that said Letters Patent is hereby corrected as shown below:

Column 10,
Line 44, before "accordance" insert -- in --.

Signed and Sealed this

Second Day of October, 2001

Attest:

*Nicholas P. Godici*

NICHOLAS P. GODICI
*Attesting Officer*       *Acting Director of the United States Patent and Trademark Office*